United States Patent
Yamamoto et al.

(10) Patent No.: US 8,711,300 B2
(45) Date of Patent: Apr. 29, 2014

(54) PROCESS FOR PRODUCING LIQUID CRYSTAL ELEMENT, AND LIQUID CRYSTAL ELEMENT

(75) Inventors: Yuji Yamamoto, Tokyo (JP); Yuriko Kaida, Tokyo (JP); Ryohei Koguchi, Tokyo (JP); Hiroshi Sakamoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 40 days.

(21) Appl. No.: 13/608,347

(22) Filed: Sep. 10, 2012

(65) Prior Publication Data

US 2013/0016318 A1    Jan. 17, 2013

Related U.S. Application Data

(63) Continuation of application No. PCT/JP2011/059296, filed on Apr. 14, 2011.

(30) Foreign Application Priority Data

Apr. 15, 2010   (JP) ................. 2010-094424

(51) Int. Cl.
    *G02F 1/1333*     (2006.01)
    *G02F 1/1337*     (2006.01)

(52) U.S. Cl.
    CPC .... *G02F 1/133711* (2013.01); *G02F 1/133365* (2013.01); *G02F 1/13378* (2013.01); *G02F 1/1333* (2013.01)
    USPC .............. 349/94; 349/122; 349/124; 349/187

(58) Field of Classification Search
    CPC .................... G02F 1/133711; G02F 1/133365; G02F 1/13378; G02F 1/1333
    USPC .................................... 349/86, 122, 124, 187
    See application file for complete search history.

(56) References Cited

U.S. PATENT DOCUMENTS

| | | | |
|---|---|---|---|
| 2007/0040972 A1* | 2/2007 | Lee et al. | .......... 349/122 |
| 2008/0158499 A1* | 7/2008 | Lai et al. | .......... 349/162 |
| 2012/0171442 A1 | 7/2012 | Yamamoto et al. | |

FOREIGN PATENT DOCUMENTS

| | | |
|---|---|---|
| JP | 10-62615 | 3/1998 |
| JP | 2005-353207 | 12/2005 |
| JP | 2006-171260 | 6/2006 |
| WO | WO 2008/026482 A1 | 3/2008 |
| WO | WO 2008/143295 A1 | 11/2008 |

OTHER PUBLICATIONS

International Search Report issued Jul. 19, 2011 in PCT/JP2011/059296 filed Apr. 14, 2011.

Summary of Lectures by Japan Society of Applied Physics 9a-D-2, Autumn in 2009.

\* cited by examiner

*Primary Examiner* — Nathanael R Briggs

(74) *Attorney, Agent, or Firm* — Oblon, Spivak, McClelland, Maier & Neustadt, L.L.P.

(57) ABSTRACT

In a process for producing a liquid crystal element comprising an alignment-treated substrate and a layer of polymer liquid crystal having a pattern, mesogenic groups in cross-linkable polymer liquid crystal are aligned, and the cross-linkable polymer liquid crystal is cross-linked while the mold is pressed against the layer of cross-linkable polymer liquid crystal, at a temperature higher than the glass transition temperature of the cross-linkable polymer liquid crystal and lower than the clearing point temperature of the cross-linkable polymer liquid crystal.

8 Claims, 2 Drawing Sheets

PROCESS FOR PRODUCING LIQUID CRYSTAL ELEMENT, AND LIQUID CRYSTAL ELEMENT

TECHNICAL FIELD

The present invention relates to a process for producing a liquid crystal element having microfabrication applied, and a high precision liquid crystal element produced by such a process.

BACKGROUND ART

With respect to a process for producing a liquid crystal element, several techniques have heretofore been known.

For example, JP-A-2005-353207 (Patent Document 1) discloses a process for producing a polarized hologram element, characterized by polymerizing the following polymer crystals in such a state that they are aligned in one direction. That is, disclosed are a polarized hologram element comprising a first transparent substrate made of a resin and provided with concavoconvex lattice on one surface, a first transparent conductive film formed on the concavoconvex lattice of the first transparent substrate, a first insulating film covering the first transparent conductive film, a second transparent substrate opposed to the first transparent substrate, a second transparent conductive film formed on the surface on the first transparent substrate side of the second transparent substrate, a second insulating film covering the second transparent conductive film, and a liquid crystal layer filled between the first and second insulating films and containing at least polymer liquid crystals aligned in one direction, and a process for producing such a polarized hologram element, which comprises sandwiching non-cured ultraviolet curable polymer crystals between the first and second insulating films, and applying a voltage to the first and second conductive films to align the polymer crystals in one direction, followed by exposure.

However, in the process for producing a polarized hologram element disclosed in Patent Document 1, it is necessary to carry out exposure after sandwiching non-cured ultraviolet curable polymer crystals between the first and second insulating films and applying a voltage to the first and second transparent conductive films to align the polymer crystals in one direction.

Further, a process is known to form a lattice-form concavoconvex structure in a layer of polymer liquid crystal by dry etching a layer of polymer liquid crystal having alignment controlled in a substrate having a liquid crystal alignment property.

In such a process, polymer liquid crystal molecules may be cleaved by dry etching to generate radicals, whereby the light resistance of the layer of polymer liquid crystal may be deteriorated. Further, it is difficult to improve the precision of the shape of the concavoconvex structure formed by dry etching. Further, although it may be possible to form a concavoconvex structure of a micron size, it is difficult to form a concavoconvex structure of a nanometer size.

Further, for example, a process is known to form a lattice-form concavoconvex pattern in a layer of polymer liquid crystal obtained by polymerizing low molecular weight liquid crystal i.e. by polymerizing (curing) photocurable low molecular weight liquid crystal, while pressing a mold having a reverse pattern of the lattice-form concavoconvex pattern, against a layer of the photocurable low molecular weight liquid crystal (liquid crystal monomer) having alignment controlled in a substrate having a liquid crystal alignment property.

By such a process, it may be possible to form a layer of polymer liquid crystal having better light resistance and better precision of the shape, but due to the alignment-controlling force (anchoring force) of the mold, the alignment direction of the photocurable low molecular weight liquid crystal is disturbed. Therefore, it is difficult to adjust the alignment direction of mesogen groups of the obtainable polymer liquid crystal to the direction of the lattice. Further, although it may be possible to control the alignment of photocurable low molecular weight liquid crystal in a concavoconvex pattern of a nanometer size by the alignment-controlling force of the mold, it may be difficult to control the alignment of photocurable low molecular weight liquid crystal in a concavoconvex pattern of a micron size.

Further, Non-Patent Document 1 discloses the following observation.

That is, with photoreactive polymer liquid crystal, it is possible to control the alignment by irradiation with polarized UV light, and it is possible to control the alignment by a mold pattern by applying thermal nanoprinting to the photoreactive polymer liquid crystal. Firstly, the photoreactive polymer liquid crystal is applied to a glass substrate by spin coating, followed by thermal nanoprinting. At that time, as the mold, a $SiO_2/Si$ mold was used, and as a mold release agent, OPTOOL DSX (manufactured by DAIKIN INDUSTRIES, LTD.) was used. The thermal nanoprinting was carried out under a pressure of 20 MPa for a retention time of 1 minute by heating the mold side and the substrate side to 150° C. When the photoreactive polymer liquid crystal is observed by a polarizing microscope, if the alignment is random, the field becomes a dark field, and if aligned in a certain direction, the field becomes a bright field. In a polarizing microscopic photograph of a 2 µm L&S (line and space) imprint pattern on the photoreactive polymer liquid crystal, the L&S pattern portion became a bright field, and a portion having no L&S pattern formed became a dark field. This means that the photoreactive polymer liquid crystal can be aligned by applying thermal nanoprinting to the photoreactive polymer liquid crystal.

However, Non-Patent Document 1 is nothing more than disclosing that thermal nanoprinting was applied to photoreactive polymer liquid crystal having random alignment, whereby the photoreactive polymer liquid crystal was aligned by alignment control by an alignment-controlling force of the mold pattern. That is, there is no disclosure about preventing or reducing disturbance in preliminarily-controlled alignment of photoreactive polymer liquid crystal by a mold, and at the same time imparting an L&S pattern to the photoreactive polymer liquid crystal by pressing a mold against the photoreactive polymer liquid crystal. Further, Non-Patent Document 1 discloses that the mold side and the substrate side are heated to a high temperature of 150° C. in order to control the alignment by a mold pattern.

PRIOR ART DOCUMENTS

Patent Document

Patent Document 1: JP-A-2005-353207

Non-Patent Document

Non-Patent Document: Autumn in 2009, Summary of Lectures by Japan Society of Applied Physics 9a-D-2

DISCLOSURE OF INVENTION

Technical Problem

It is an object of the present invention to provide a process for producing a liquid crystal element, and a liquid crystal element produced by such a process.

Solution to Problem

The present invention provides a process for producing a liquid crystal element comprising an alignment-treated substrate and a layer of polymer liquid crystal having a pattern, which comprises a step of forming a layer of cross-linkable polymer liquid crystal on the alignment-treated substrate, a step of aligning mesogenic groups in the cross-linkable polymer liquid crystal, a step of pressing a mold having a reverse pattern of a pattern to be imparted to the layer of polymer liquid crystal, against the layer of cross-linkable polymer liquid crystal, at a temperature higher than the glass transition temperature of the cross-linkable polymer liquid crystal and lower than the clearing point temperature of the cross-linkable polymer liquid crystal, a step of cross-linking the cross-linkable polymer liquid crystal while the mold is pressed against the layer of cross-linkable polymer liquid crystal, to form a cured product, and a step of removing the mold from the cured product.

In the process for producing a liquid crystal element, it is preferred that at the time of pressing the mold against the layer of cross-linkable polymer liquid crystal, the viscosity of the layer of cross-linkable polymer liquid crystal is from $10^3$ Pa·sec. to $10^6$ Pa·sec.

Further, the number average molecular weight of the cross-linkable polymer liquid crystal is preferably from 2,000 to 50,000.

Further, the step of cross-linking the cross-linkable polymer liquid crystal to form a cured product, preferably includes a step of photo-curing the cross-linkable polymer liquid crystal.

Further, the layer of polymer liquid crystal having a pattern is preferably a layer of polymer liquid crystal having a lattice pattern.

Further, the process preferably further contains a step of filling a curable composition into grooves of the pattern in the layer of polymer liquid crystal and curing the curable composition.

Further, the layer of cross-linkable polymer liquid crystal is preferably formed by a solution for forming the layer of cross-linkable polymer liquid crystal, which comprises cross-linkable polymer liquid crystal, a photopolymerization initiator and a surfactant.

The present invention provides a liquid crystal element produced by the above process for producing a liquid crystal element of the present invention.

Advantageous Effects of Invention

According to the process for producing a liquid crystal element of the present invention, it becomes possible to control alignment of liquid crystal without applying a voltage and to provide a process for producing a liquid crystal element having microfabrication applied, and by such a process, it becomes possible to provide a high precision liquid crystal element having good optical properties such as light resistance.

DESCRIPTION OF EMBODIMENTS

Figure 1:
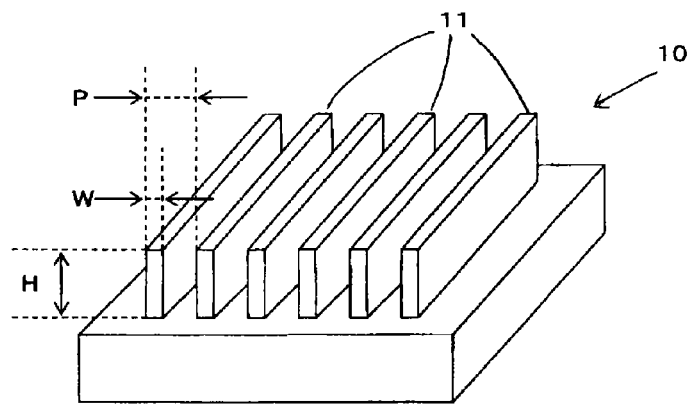
FIG. 1 is a view schematically illustrating an example of a mold to transfer a pattern to a cross-linkable polymer liquid crystal layer in the present invention.

The process for producing a liquid crystal element of the present invention is a process for producing a liquid crystal element comprising an alignment-treated substrate and a layer of polymer liquid crystal having a pattern, which comprises a step of forming a layer of cross-linkable polymer liquid crystal containing mesogen groups (i.e. cross-linkable polymer liquid crystal containing mesogen groups) on the alignment-treated substrate, a step of aligning the mesogen groups in the cross-linkable polymer liquid crystal, a step of pressing a mold having a reverse pattern of a pattern to be imparted to the layer of polymer liquid crystal, against the layer of cross-linkable polymer liquid crystal, at a temperature higher than the glass transition temperature of the cross-linkable polymer liquid crystal and lower than the clearing point temperature of the cross-linkable polymer liquid crystal, a step of cross-linking the cross-linkable polymer liquid crystal while the mold is pressed against the layer of cross-linkable polymer liquid crystal, to form a cured product, and a step of removing the mold from the cured product, in the order of the above described steps.

Here, the alignment-treated substrate may, for example, be a substrate having an alignment film like a substrate having a rubbing-treated film, or a substrate subjected to patterning. As a substrate having alignment treatment applied to liquid crystal, a substrate having a rubbing-treated polyimide film may, for example, be mentioned. The alignment-controlling force (anchoring force) of a substrate having a rubbing-treated polyimide film is preferably at least $0.5 \times 10^{-3}$ J/m$^2$. In a case where the alignment-controlling force of a substrate having a rubbing-treated polyimide film is at least $0.5 \times 10^{-3}$ J/m$^2$, it becomes possible to align mesogen in the cross-linkable polymer liquid crystal contained in the layer of cross-linkable polymer liquid crystal, by the alignment-controlling force of the substrate. Here, the cross-linkable polymer liquid crystal has mesogen groups and cross-linkable groups.

With respect to mesogen groups which contribute to the anisotropy of cross-linkable polymer liquid crystal, alicyclic hydrocarbon rings, aromatic hydrocarbon rings and heterorings may, for example, be mentioned. In a case where a plurality of rings are contained in a mesogen group, such a plurality of rings may directly be bonded to one another or may indirectly be bonded via a connecting group. Further, in a case where a plurality of rings are contained in a mesogen group, such a plurality of rings contained in a mesogen group may be a combination of the same or different rings. The number of rings contained in a mesogen group is preferably at least 2 and at most 4, more preferably 2 or 3. When the number of rings contained in a mesogen group is at least 2, it becomes possible to obtain liquid-crystallinity of cross-linkable polymer liquid crystal. When the number of rings contained in a mesogen group is at most 4, the melting point of cross-linkable polymer liquid crystal becomes low. In such a case that the number of rings is at most 4, precipitation of crystals in the step of cross-linking the cross-linkable polymer liquid crystal will be reduced, and it becomes possible to lower the haze value of the cured cross-linkable polymer liquid crystal.

The cross-linkable group may, for example, be an acryloyloxy group ($CH_2$=CHCOO—), a methacryloyloxy group ($CH_2$=C($CH_3$)COO—), a vinyl group, an allyl group or a cyclic ether group. However, the cross-linkable group is more preferably an acryloyloxy group or a methacryloyloxy group.

The cross-linkable polymer liquid crystal is preferably a side chain type polymer liquid crystal wherein mesogen groups in liquid-crystallizable monomer units having the mesogen groups constitute side chains of cross-linkable polymer liquid crystal.

Liquid-crystallizable monomer units constituting cross-linkable polymer liquid crystal may be constituted solely by liquid-crystallizable monomer units having cross-linkable groups, or may be constituted by liquid-crystallizable monomer units having cross-linkable groups and liquid-crystallizable monomer units not having cross-linkable groups. In a case where the proportion of the number of liquid-crystallizable monomer units having cross-linkable groups in the total number of liquid-crystallizable monomer units is larger, cross-linked polymer liquid crystal is more stable. That is, it has higher heat resistance, and/or higher solvent resistance and/or water resistance. On the other hand, in a case where the proportion of the number of liquid-crystallizable monomer units having cross-linkable groups in the total number of liquid-crystallizable monomer units is smaller, it becomes possible to prevent or reduce cure shrinkage when the cross-linkable polymer liquid crystal is cross-linked and cured. For example, in a case where the cross-linkable groups are acryloyloxy groups, when the proportion of the number of liquid-crystallizable monomer units having cross-linkable groups in the total number of liquid-crystallizable monomer units is from 40 to 50%, cross-linked polymer liquid crystal has relatively high solvent resistance and water resistance, and cure shrinkage is relatively little.

Such cross-linkable polymer liquid crystal is preferably obtained by introducing cross-linkable groups to polymer liquid crystal obtained by polymerizing a liquid-crystallizable monomer having a polymerizable functional group. Such polymer liquid crystal may be one having one type of liquid-crystallizable monomer homopolymerized or one having a plurality of liquid-crystallizable monomers copolymerized, and may suitably be selected depending upon e.g. the properties required for the liquid crystal element. Here, the polymerizable functional group may be the same group as the above-mentioned cross-linkable group, and its preferred mode is also the same.

The liquid-crystallizable monomer may be a liquid-crystallizable monomer represented by the following formula (A).

$$CH_2=CR^1—COO—(CH_2)_m—(O)_n—X—M \quad (A)$$

Here, $R^1$ is a hydrogen atom or a methyl group, m is an integer of from 0 to 12, n is 0 when m is 0, or 1 when m is an integer of from 1 to 12, X is a single bond, —COO—, —OCO— or —CO—, and M is a mesogen group wherein a plurality of rings are directly bonded or indirectly bonded via a connecting group. Further, hydrogen atoms of the rings in M may be substituted by e.g. a methyl group, a methoxy group, a cyano group or the like. m is preferably an integer of from 1 to 12, more preferably an integer of from 2 to 6.

The liquid-crystallizable monomer represented by the formula (A) includes, for example, the following monomers.

$CH_2=CR^1—COO—(CH_2)_m O$-Ph-Ph, $CH_2=CR^1—COO—(CH_2)_m O$-Ph-Cy, $CH_2=CR^1—COO—(CH_2)_m O$-Ph-COO-Ph, $CH_2=CR^1—COO—(CH_2)_m O$-Ph=Ph, $CH_2=CR^1—COO—(CH_2)_m O$-Ph-$Z^1$-Ph-$Z^2$-Ph, $CH_2=CR^1—COO—(CH_2)_m O$—COO-Ph-$Z^1$-Ph-$Z^2$-Ph, $CH_2=CR^1—COO—(CH_2)_m O$—CO-Ph-$Z^1$-Ph-$Z^2$-Ph.

Here, $R^1$ and m are as defined above, each of $Z^1$ and $Z^2$ which are independent of each other, is a single bond, —COO—, —OCO— or —CO—, Ph is a 1,4-phenylene group (provided that hydrogen atoms of the ring may be substituted by a methyl group, a methoxy group or a cyano group), and Cy is a 1,4-cyclohexylene group.

Further, at least a part of the liquid-crystallizable monomer has a reactive group such as a hydroxy group in a terminal cyclic group contained in a mesogen group (M) so that a cross-linkable group may later be introduced. The cross-linkable polymer liquid crystal in the present invention can be obtained by introducing crosslinkable groups to a polymer of the above described liquid-crystallizable monomer, by a method such as an esterification reaction.

The cross-linkable polymer liquid crystal may, for example, be cross-linkable polymer liquid crystal (B-2) disclosed in Examples given hereinafter.

Further, plural types of cross-linkable polymer liquid crystal may be used in combination. In such a case, the combination and proportions of the plural types of cross-linkable polymer liquid crystal may suitably be set depending upon the particular use and/or the properties required for a liquid crystal element.

In the process for producing a liquid crystal element of the present invention, a layer of cross-linkable polymer liquid crystal is formed on the alignment-treated substrate, whereby it becomes possible to align mesogen groups in the cross-linkable polymer liquid crystal.

Here, the step of forming a layer of cross-linkable polymer liquid crystal on the alignment-treated substrate, includes, for example, a step of applying a solution containing the cross-linkable polymer liquid crystal to one side of the alignment-treated substrate, or a step of sandwiching the cross-linkable polymer liquid crystal between a plurality of alignment-treated substrates. In the latter case, it becomes possible to increase the thickness of the layer of the cross-linkable polymer liquid crystal (to a thickness of about a few tens micrometers) and accordingly to increase the size of a pattern to be imparted to the layer of the cross-linkable polymer liquid crystal.

Further, the step of forming a layer of cross-linkable polymer liquid crystal on the alignment-treated substrate, includes, for example, a step of heating the layer of cross-linkable polymer liquid crystal or a solution containing cross-linkable polymer liquid crystal. By heating the layer of cross-linkable polymer liquid crystal or a solution containing cross-linkable polymer liquid crystal, it becomes possible to randomly align mesogen groups of cross-linkable polymer liquid crystal. Then, by lowering the temperature of the layer of cross-linkable polymer liquid crystal or the solution containing the cross-linkable polymer liquid crystal, it becomes possible to re-align mesogen groups of cross-linkable polymer liquid crystal at a certain temperature within a liquid crystal temperature range, whereby alignment of mesogen groups tends to be easily controlled. Such a certain temperature within the liquid crystal temperature range depends also on the type of material for cross-linkable polymer liquid crystal, but it is, for example, a temperature of at least −20° C. of the clearing point temperature of cross-linkable polymer liquid crystal and at most −10° C. of the clearing point temperature of cross-linkable polymer liquid crystal. When the temperature of liquid crystal is raised, the liquid crystal phase changes to an isotropic liquid, and the clearing point (Tc) means the temperature at which the liquid crystal phase changes to the isotropic liquid (transparent liquid).

In the present invention, the layer of cross-linkable polymer liquid crystal preferably contains a surfactant. In such a case, it becomes easy to remove the mold from the layer of cross-linked polymer liquid crystal. Further, as the cross-linkable polymer liquid crystal contains a surfactant, it becomes easy to align mesogen groups present in the vicinity of the interface with the atmosphere, of the layer of cross-linkable polymer liquid crystal, in accordance with the liquid crystal-aligning property of the substrate.

The surfactant may, for example, be a compound having a fluoroalkyl group, a silicone chain or a $C_{4-24}$ alkyl group. Such a compound may have an etheric oxygen atom. Preferred is a compound having a fluoroalkyl group. The fluoroalkyl group may, for example, be a perfluoroalkyl group, a polyfluoroalkyl group or a perfluoropolyether group. The silicone chain may, for example, be dimethyl silicone or methyl phenyl silicone. The $C_{4-24}$ alkyl group may, for example, be a n-hexyl group, a n-heptyl group, a n-octyl group, a n-nonyl group, a n-decyl group, a n-dodecyl group, a lauryl group or an octadecyl group. The $C_{4-24}$ alkyl group is preferably a linear group or a branched group. The amount of the surfactant contained in the layer of cross-linkable polymer liquid crystal is suitably selected depending upon e.g. removability of the mold from the layer of the cured product having cross-linkable polymer liquid crystal cross-linked and efficiency for aligning mesogen of cross-linkable polymer liquid crystal by the alignment-treated substrate.

In the process for producing a liquid crystal element of the present invention, a mold having a reverse pattern of a pattern to be imparted to the layer of cross-linkable polymer liquid crystal, is pressed against the layer of cross-linkable polymer liquid crystal, at a temperature higher than the glass transition temperature of the cross-linkable polymer liquid crystal and lower than the clearing point temperature of the cross-linkable polymer liquid crystal. It is thereby possible to prevent or reduce disturbance in alignment by the mold and to impart a pattern to the layer of cross-linkable polymer liquid crystal by the mold in such a state that mesogen groups of cross-linkable polymer liquid crystal contained in the layer of cross-linkable polymer liquid crystal, are aligned.

Here, since the mold is pressed against the layer of cross-linkable polymer liquid crystal at a temperature higher than the glass transition temperature of the cross-linkable polymer liquid crystal, it becomes possible to impart a pattern to the layer of cross-linkable polymer liquid crystal. As the pressure at the time of pressing the mold against the layer of cross-linkable polymer liquid crystal, a suitable pressure is selected depending upon e.g. the temperature at the time of pressing, the material of cross-linkable polymer liquid crystal, the alignment-controlling forces of the alignment film, substrate and mold, and the pattern of the mold. The pressure at the time of such pressing is not particularly limited, but a pressure of from 0.01 to 10 MPa may, for example, be mentioned.

Further, since the mold is pressed against the layer of cross-linkable polymer liquid crystal at a temperature lower than the clearing point temperature of the cross-linkable polymer liquid crystal, it becomes possible to prevent or reduce disturbance in alignment of mesogen groups of cross-linkable polymer liquid crystal by the mold at the time of imparting a pattern to the layer of cross-linkable polymer liquid crystal.

In addition, the temperature higher than the glass transition temperature of cross-linkable polymer liquid crystal and lower than the clearing point temperature of cross-linkable polymer liquid crystal is a temperature lower than the temperature of the layer of cross-linkable polymer liquid crystal at the time of aligning mesogen groups of cross-linkable polymer liquid crystal.

Further, the temperature higher than the glass transition temperature of cross-linkable polymer liquid crystal and lower than the clearing point temperature of cross-linkable polymer liquid crystal depends on e.g. the viscosity characteristic of the material of cross-linkable polymer liquid crystal, the alignment-controlling force of the alignment-treated substrate and the alignment-controlling force of the mold. For example, in a case where the ratio of the alignment-controlling force of the mold to the alignment-controlling force of the alignment-treated substrate is small, the temperature higher than the glass transition temperature of cross-linkable polymer liquid crystal and lower than the clearing point temperature of cross-linkable polymer liquid crystal is a temperature close to the clearing point of the cross-linkable polymer liquid crystal. Whereas, if the ratio of the alignment-controlling force of the mold to the alignment-controlling force of the alignment-treated substrate increases, the temperature higher than the glass transition temperature of a curable liquid crystal polymer (cross-linkable polymer liquid crystal) and lower than the clearing point temperature of the curable liquid crystal polymer (cross-linkable polymer liquid crystal) becomes a lower temperature, in order to prevent or reduce disturbance in alignment of mesogen groups of cross-linkable polymer liquid crystal by the mold. The above temperature of the layer of cross-linkable polymer liquid crystal at the time of pressing the mold against the layer of cross-linkable polymer liquid crystal is suitably selected depending upon the material of cross-linkable polymer liquid crystal, the alignment-controlling force of the mold, the pattern of the mold, etc. as mentioned above. Although not particularly limited, such a temperature of the layer of cross-linkable polymer liquid crystal at the time of such pressing may, for example, be within a range of from the glass transition temperature (Tg) of the cross-linkable polymer liquid crystal to Tg+50° C.

Since the mold is pressed against the layer of cross-linkable polymer liquid crystal at a temperature higher than the glass transition temperature of cross-linkable polymer liquid crystal and lower than the clearing point temperature of cross-linkable polymer liquid crystal, the mold is pressed at a relatively low temperature against the layer of cross-linkable polymer liquid crystal.

In the process for producing a liquid crystal element of the present invention, the cross-linkable polymer liquid crystal is cross-linked while the mold is pressed against the layer of cross-linkable polymer liquid crystal. It is thereby possible to cross-link the cross-linkable polymer liquid crystal in such a state that alignment of mesogen groups of cross-linkable polymer liquid crystal contained in the layer of cross-linkable polymer liquid crystal is substantially maintained and in such a state that a pattern is imparted to the layer of cross-linkable polymer liquid crystal by the mold.

In the process for producing a liquid crystal element of the present invention, the mold is removed from the layer of a cured product of cross-linked polymer liquid crystal, whereby it becomes possible to obtain the layer of the cured product of cross-linkable polymer liquid crystal having a pattern imparted while substantially maintaining the alignment of mesogen groups of cross-linkable polymer liquid crystal. That is, it becomes possible to obtain a liquid crystal element comprising the alignment-treated substrate and the layer of the cured product of cross-linkable polymer liquid crystal having a pattern imparted while substantially maintaining the alignment of mesogen groups of cross-linkable polymer liquid crystal.

Further, at the time of removing the mold from the layer of the cured product of cross-linked polymer liquid crystal, the temperature of such a layer is a temperature lower than the temperature at the time of pressing the mold against the layer of cross-linkable polymer liquid crystal but higher than the glass transition temperature of the cross-linkable polymer liquid crystal, or a temperature lower than the glass transition temperature of the cross-linkable polymer liquid crystal.

Thus, according to the process for producing a liquid crystal element of the present invention, it becomes possible to provide a process for producing a liquid crystal element wherein the alignment direction of mesogen groups of cross-linkable polymer liquid crystal in the layer of the cured product of cross-linked polymer liquid crystal, is substantially independent from the pattern imparted to the layer of cross-linked polymer liquid crystal, or substantially the same or different from the directional pattern imparted to the layer of the cross-linked polymer liquid crystal.

Further, according to the process for producing a liquid crystal element of the present invention, it becomes possible to provide a process for producing a liquid crystal element wherein the layer of the cross-linked polymer liquid crystal has superior light resistance.

Further, according to the process for producing a liquid crystal element of the present invention, it becomes possible to provide a process for producing a liquid crystal element, wherein the shape of the pattern imparted to the layer of the cross-linked polymer liquid crystal has superior precision.

In addition, according to the process for producing a liquid crystal element of the present invention, it becomes possible to provide a process for producing a liquid crystal element which has a layer of the cross-linked polymer liquid crystal having a pattern of a micrometer (from a few micrometers to a few tens micrometers) size or a nanometer size imparted.

Further, according to the process for producing a liquid crystal element of the present invention, it becomes possible to provide a process for producing a liquid crystal element, whereby it is not required to apply a voltage to the layer of cross-linkable polymer liquid crystal.

In the process for producing a liquid crystal element of the present invention, the thickness of the layer of cross-linkable polymer liquid crystal to be formed on the alignment-treated substrate (i.e. the thickness of the polymer liquid crystal layer subjected to cross-linking treatment and cured) is suitably selected depending upon e.g. the height (i.e. the depth) of a pattern to be formed in the polymer liquid crystal layer, as its lower limit, or depending on the thickness within a range where liquid crystal can be aligned, as its upper limit. Although not particularly limited, an example of the upper limit thickness is about 20 µm.

In the process for producing a liquid crystal element of the present invention, the viscosity of the layer of cross-linkable polymer liquid crystal at the time of pressing the mold against the layer of cross-linkable polymer liquid crystal, is preferably at least $10^3$ Pa·sec. and at most $10^6$ P·sec., more preferably at least $10^4$ Pa·sec. and at most $10^5$ Pa·sec.

When the viscosity is at least $10^3$ Pa·sec., it becomes possible to more effectively prevent or reduce disturbance in alignment of mesogen groups of cross-linkable polymer liquid crystal by the mold. Especially, even if the mold has an alignment-controlling force (anchoring force), it becomes possible to more effectively prevent or reduce disturbance in alignment of mesogen groups of cross-linkable polymer liquid crystal by the mold.

On the other hand, when the viscosity of the layer of a curable liquid crystal polymer at the time of pressing the mold against the layer of the curable liquid crystal polymer, is at most $10^6$ Pa·sec., it becomes possible to more easily press the mold against the layer of cross-linkable polymer liquid crystal.

In the process for producing a liquid crystal element of the present invention, the number average molecular weight of cross-linkable polymer liquid crystal is preferably at least 2,000 and at most 50,000, more preferably at least 4,000 and at most 25,000.

When the number average molecular weight of cross-linkable polymer liquid crystal is at least 2,000, it becomes possible to more effectively prevent or reduce disturbance in alignment of mesogen groups of cross-linkable polymer liquid crystal by the mold. Especially, even if the mold has an alignment-controlling force (anchoring force), it becomes possible to more effectively prevent or reduce disturbance in alignment of mesogen groups of cross-linkable polymer liquid crystal by the mold.

On the other hand, when the number average molecular weight of the curable liquid crystal polymer (cross-linkable polymer liquid crystal) is at most 50,000, it becomes possible to more easily press the mold against the layer of cross-linkable polymer liquid crystal. Further, the alignment degree of mesogen groups of cross-linkable polymer liquid crystal becomes higher, whereby it becomes possible to obtain a transparent liquid crystal element. Further, it is possible to shorten the time required for the alignment treatment.

In the process for producing a liquid crystal element of the present invention, as a method for crosslinking the cross-linkable polymer liquid crystal, it is preferred to photo-crosslink the cross-linkable polymer liquid crystal.

For example, in a case where the cross-linkable polymer liquid crystal has cross-linkable groups sensitive to ultraviolet rays, it is possible to cure (crosslink) the cross-linkable polymer liquid crystal by irradiating the cross-linkable polymer liquid crystal with ultraviolet rays.

In a case where crosslinking of the cross-linkable polymer liquid crystal is carried out by photo-crosslinking, it is possible to more easily cure (crosslink) the cross-linkable polymer liquid crystal in such a state that alignment of mesogen groups of the cross-linkable polymer liquid crystal is substantially maintained and in such a state that a pattern is imparted to the layer of cross-linkable polymer liquid crystal by the mold.

Further, in the case of photo-crosslinking the cross-linkable polymer liquid crystal, it is preferred to add a photopolymerization initiator to the cross-linkable polymer liquid crystal. The photopolymerization initiator is a compound to induce a radical polymerization reaction or an ion polymerization reaction of a curable (cross-linkable) polymer liquid crystal by light. For example, the layer of cross-linkable polymer liquid crystal is preferably formed by a solution for forming a layer of cross-linkable polymer liquid crystal, which comprises from 99 to 90 mass % of crosslinkable polymer liquid crystal and from 1 to 10 mass % of a photopolymerization initiator. In such a case, it becomes possible to reduce a residue of the photopolymerization initiator and to reduce or prevent deterioration of the physical properties of the cross-linkable polymer liquid crystal, and at the same time it becomes possible to more easily crosslink the cross-linkable polymer liquid crystal. Particularly preferred is a photopolymerizable composition comprising from 95 to 98 mass % of cross-linkable polymer liquid crystal and from 2 to 5 mass % of a photopolymerization initiator.

The photopolymerization initiator may, for example, be (A) an acetophenone type photopolymerization initiator, (B) a benzoin type photopolymerization initiator, (C) a benzophenone type photopolymerization initiator, (D) a thioxanthone type photopolymerization initiator, (E) a photopolymerization initiator containing fluorine atoms, such as perfluoro(tert-butyl peroxide) or perfluorobenzoyl peroxide, or (F) other photopolymerization initiators such as α-acyloxime ester, benzyl-(o-ethoxycarbonyl)-α-monooxime, acylphosphine oxide, glyoxy ester, 3-ketocoumarin, 2-ethylanthraquinone, camphorquinone, tetramethylthiuram sulfide, azobisisobutyronitrile, benzoyl peroxide, a dialkyl peroxide, tert-butyl peroxypivalate, etc.

In the process for producing a liquid crystal element of the present invention, the step of forming a layer of cross-linkable polymer liquid crystal on an alignment-treated substrate preferably includes a step of heating the layer of a curable liquid crystal polymer (cross-linkable polymer liquid crystal) at a temperature of at least the clearing point temperature of the curable liquid crystal polymer (cross-linkable polymer liquid crystal). In such a case, by heating the layer of the cross-linkable polymer liquid crystal at a temperature of at least the clearing point temperature of the cross-linkable polymer liquid crystal, it becomes possible to make alignment of mesogen groups of cross-linkable polymer liquid crystal to be random. And, by lowering the temperature of the layer of cross-linkable polymer liquid crystal to a temperature of less than the clearing point of the cross-linkable polymer liquid crystal, it becomes possible to effectively re-align the mesogen groups.

In the process for producing a liquid crystal element of the present invention, the alignment-controlling force (anchoring force) of the mold is preferably at most $1 \times 10^{-1}$ J/m$^2$. When the alignment-controlling force of the mold is at most $1 \times 10^{-1}$ J/m$^2$, it becomes possible to effectively prevent or reduce disturbance in alignment of mesogen groups of cross-linkable polymer liquid crystal by the mold and to more easily impart a pattern to the layer of cross-linkable polymer liquid crystal by the mold.

FIG. 1 is a view schematically illustrating an example of a mold 10 having a reverse pattern 11 of a pattern to be imparted to the layer of cross-linkable polymer liquid crystal in the present invention. The example of a mold 10 shown in FIG. 1 has a line-and-space (lattice-form) pattern having a pitch P, a width W and a height H. In the example of a mold shown in FIG. 1, the alignment-controlling force (anchoring force) of the mold is approximately proportional to the square of the line-and-space height H and is inversely proportional to the cube of the line-and-space pitch P. Therefore, as the line-and-space height H decreases (increases), the alignment-controlling force (anchoring force) of the mold decreases (increases). Further, as the line-and-space pitch P increases (decreases), the alignment-controlling force (anchoring force) of the mold decreases (increases).

In the process for producing a liquid crystal element of the present invention, the speed of the mold at the time of pressing the mold against the layer of cross-linkable polymer liquid crystal depends on the viscosity of the layer of cross-linkable polymer liquid crystal and on the pressure exerted to the mold. As a means to exert a pressure to the mold, a means to exert a pressure to the mold by a roller may, for example, be mentioned. In a case where the speed of the mold to be pressed against the layer of cross-linkable polymer liquid crystal is small, the pressure of the mold against the layer of cross-linkable polymer liquid crystal is small, whereby it becomes possible to reduce an influence of pressing the mold to the alignment of mesogen groups of cross-linkable polymer liquid crystal. It thereby becomes possible to make the temperature of the layer to be higher at the time of pressing the mold against the layer of cross-linkable polymer liquid crystal. On the other hand, in a case where the speed of the mold to be pressed against the layer of cross-linkable polymer liquid crystal is high, the pressure of the mold against the layer of cross-linkable polymer liquid crystal is large, whereby it becomes possible to more easily press the mold against the layer. It thereby becomes possible to make the temperature of the layer to be lower at the time of pressing the mold against the layer of cross-linkable polymer liquid crystal.

Figure 2:
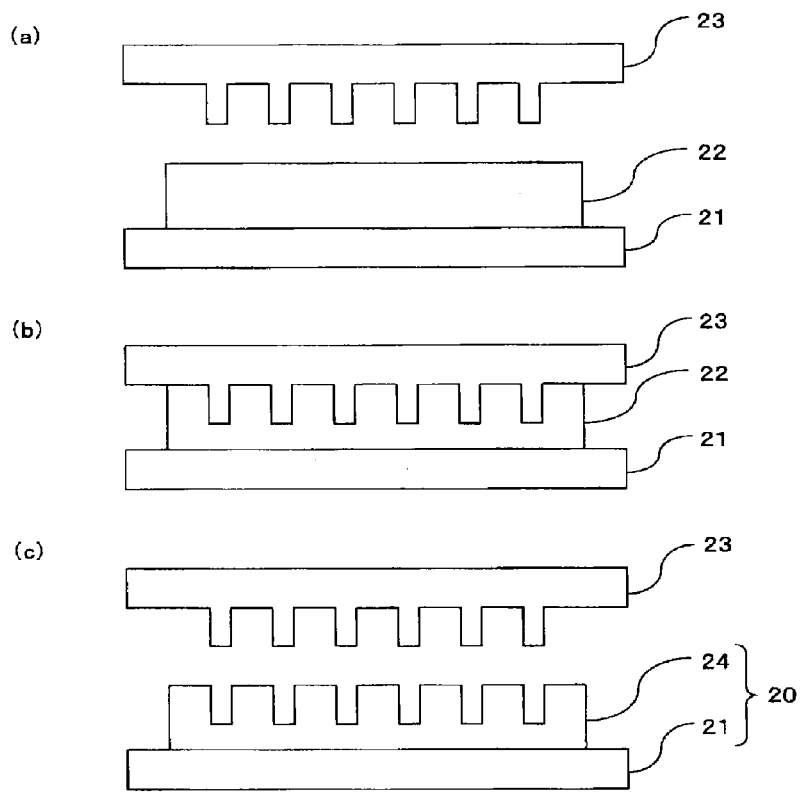
FIG. 2 is a view schematically illustrating an example of the process for producing a liquid crystal element of the present invention.

FIG. 2 is a view schematically illustrating an example of the process for producing a liquid crystal element of the present invention. FIG. 2(a) is a view schematically illustrating an example of the step of forming a layer of cross-linkable polymer liquid crystal on the alignment-treated substrate. FIG. 2(b) is a view schematically illustrating an example of the step of pressing a mold having a reverse pattern of a pattern to be imparted to the layer of cross-linkable polymer liquid crystal against the layer of cross-linkable polymer liquid crystal at a temperature higher than the glass transition temperature of the cross-linkable polymer liquid crystal and lower than the clearing point temperature of a curable liquid crystal polymer (cross-linkable polymer liquid crystal), and the step of crosslinking the cross-linkable polymer liquid crystal while the mold is pressed against the layer of cross-linkable polymer liquid crystal. FIG. 2(c) is a view schematically illustrating an example of the step of removing the mold from the layer of a cured product of cross-linked polymer liquid crystal.

FIG. 2 illustrates the process for producing a liquid crystal element 20 comprising an alignment-treated substrate 21 and a layer 24 of a cured product of cross-linked polymer liquid crystal.

Firstly, as shown in FIG. 2(a), a layer 22 of cross-linkable polymer liquid crystal is formed on the alignment-treated substrate 21. Here, the alignment-treated substrate 21 is a substrate having a rubbing-treated polyimide film to align the long axes of mesogen groups of cross-linkable polymer liquid crystal in a direction horizontal to the surface of the substrate 21. Further, the layer 22 of cross-linkable polymer liquid crystal contains in addition to cross-linkable polymer liquid crystal having mesogen groups and crosslinkable groups such as acryloyl groups or methacryloyl groups, a photopolymerization initiator and a surfactant. Here, the cross-linkable polymer liquid crystal is side chain type polymer liquid crystal wherein mesogen groups of liquid-crystallizable monomer units constitute side chains of cross-linkable polymer liquid crystal.

Here, the layer 22 of cross-linkable polymer liquid crystal is heated at a temperature of at least the clearing point (Tc) of the cross-linkable polymer liquid crystal, thereby to make the alignment of mesogen of cross-linkable polymer liquid crystal contained in the layer 22 of cross-linkable polymer liquid crystal to be random alignment. And, by lowering the temperature of the layer 22 of cross-linkable polymer liquid crystal to a temperature of less than the clearing point (Tc) of the cross-linkable polymer liquid crystal (e.g. a temperature lower by from 10 to 20° C. than the clearing point (Tc) temperature of photo-curable polymer liquid crystal), mesogen groups of cross-linkable polymer liquid crystal are re-aligned. At that time, since the layer 22 of cross-linkable polymer liquid crystal contains a surfactant, the cross-linkable polymer liquid crystal is more easily aligned in a direction horizontal to the surface of the alignment-treated substrate 21.

Then, as shown in FIG. 2(b), a mold 23 having a reverse pattern of a pattern to be imparted to the layer 22 of cross-linkable polymer liquid crystal, is pressed against the layer 22 of cross-linkable polymer liquid crystal at a temperature lower than the temperature for re-aligning mesogen groups of cross-linkable polymer liquid crystal (e.g. a temperature lower by from 10 to 20° C. than the clearing point (Tc) temperature of a photo-curable liquid crystal polymer) and higher than the glass transition temperature (Tg) of the cross-linkable polymer liquid crystal, and lower than the clearing point (Tc) temperature of the cross-linkable polymer liquid crystal (e.g. a temperature lower by from 70 to 80° C. than the clearing point (Tc) of a photocurable liquid crystal polymer). The viscosity of the layer 22 at the time of thus pressing the mold against the layer 22 of cross-linkable polymer liquid crystal, is preferably at least $10^3$ Pa·sec. and at most $10^6$ Pa·sec.

Here, as a means to exert a pressure to the mold 23 in order to press the mold 23 against the layer 22 of cross-linkable polymer liquid crystal, a means of exerting a pressure to the mold by a roller is typically used. Further, the mold 23 has a line-and-space pattern. Thus, disturbance in alignment of mesogen groups by the mold 23 is prevented or reduced, and a line-and-space pattern is imparted to the layer 22 of cross-linkable polymer liquid crystal by the mold 23, while substantially maintaining the alignment of mesogen groups of cross-linkable polymer liquid crystal contained in the layer 22 of cross-linkable polymer liquid crystal.

Then, the cross-linkable polymer liquid crystal is photo-crosslinked in such a state that the mold 23 is pressed against the layer 22 of cross-linkable polymer liquid crystal. More specifically, the photo-crosslinkable polymer liquid crystal is cured (i.e. cross-linked) by irradiating the cross-linkable polymer liquid crystal with ultraviolet rays.

Finally, as shown in FIG. 2(c), the mold 23 is removed from the layer 24 of a cured product of photo-crosslinked polymer liquid crystal, at a temperature lower than the temperature at the time of pressing the mold 23 against the layer 22 of cross-linkable polymer liquid crystal (e.g. a temperature in the vicinity of the glass transition point (Tg) of cross-linkable polymer liquid crystal). It is thereby possible to obtain the layer 24 of a cured product of cross-linked polymer liquid crystal, having a line-and-space pattern imparted, while substantially maintaining the alignment of mesogen groups of cross-linkable polymer liquid crystal, i.e. to obtain a liquid crystal element 20 comprising the alignment-treated substrate 21 and the layer 24 of a cured product of cross-linked polymer liquid crystal. Here, the pitch of the line-and-space pattern may possibly be from a nanometer pitch to a micrometer (from 20 to 30 micrometer) pitch.

Thus, according to the process for producing a liquid crystal element 20 shown in FIG. 2, it becomes possible to provide a process for producing a liquid crystal element, wherein the alignment direction of mesogen groups of polymer liquid crystal in the layer 24 of photo-crosslinked polymer liquid crystal (the direction of the long axes of mesogen groups aligned in a direction horizontal to the surface of the substrate 21) is different from the longitudinal direction of the line-and-space pattern imparted to the layer 24 of a cured product of photo-crosslinked polymer liquid crystal, and the layer 24 of photo-crosslinked polymer liquid crystal has a line-and-space pattern having superior light resistance and superior precision.

The liquid crystal element of the present invention is a liquid crystal element produced by the process for producing a liquid crystal element of the present invention.

The liquid crystal element of the present invention is characterized in that it is produced by the process for producing a liquid crystal element of the present invention, whereby it becomes possible to provide a liquid crystal element, wherein the alignment direction of mesogen groups of polymer liquid crystal in the layer of cross-linked polymer liquid crystal is substantially independent from the pattern imparted to the layer of cross-linked polymer liquid crystal, or substantially the same or different from the direction of a directional pattern imparted to the layer of cross-linked polymer liquid crystal. Further, it becomes possible to provide a liquid crystal element, wherein the layer of cross-linked polymer liquid crystal has superior light resistance. Further, it becomes possible to provide a liquid crystal element, wherein the shape of a pattern imparted to the layer of cross-linked polymer liquid crystal has superior precision. In addition, it becomes possible to provide a liquid crystal element having a layer of cross-linked polymer liquid crystal, having a micrometer (a few micrometer to a few tens micrometer) size or a nanometer size imparted. Further, it becomes possible to provide a process for producing a liquid crystal element, which does not require a means to apply a voltage to cross-linkable polymer liquid crystal in order to control the alignment.

As the shape of a pattern to be imparted to the layer of cross-linkable polymer liquid crystal, various patterns may suitably be selected depending upon the desired application of the liquid crystal element. For example, in an application to a retardation film, a wave plate or the like, a rectangular groove pattern is employed, and in an application to a diffraction grating, in addition to a rectangular groove pattern, a serrated groove or sine wave groove pattern, or a combined pattern thereof may be used, but the present invention is by no means limited to such patterns.

Here, with respect to a liquid crystal element having a layer of cross-linked polymer liquid crystal having a pattern of a micrometer (a few micrometer to a few tens micrometer) size imparted, an application to e.g. a diffraction grating may, for example, be mentioned. Whereas, with respect to a liquid crystal element having a layer of cross-linked polymer liquid crystal having a pattern of a nanometer size imparted, an application to e.g. a wave plate may, for example, be mentioned.

Figure 3:
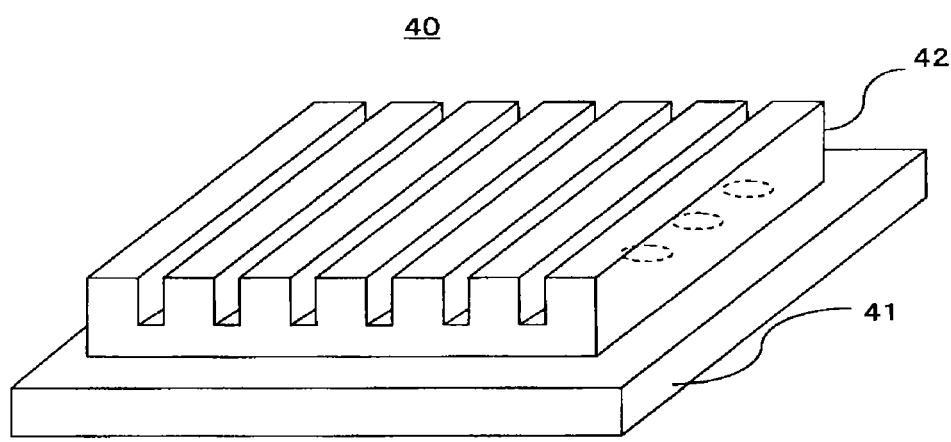
FIG. 3 is a view schematically illustrating an example of the liquid crystal element of the present invention.

FIG. 3 is a view schematically illustrating an example of the liquid crystal element of the present invention. More specifically, it schematically illustrates the liquid crystal element produced by the example of the process for producing a liquid crystal element of the present invention shown in FIG. 2. Like the liquid crystal element 20 shown in FIG. 2, the liquid crystal element 40 shown in FIG. 3 comprises an alignment-treated substrate 41 and a layer 42 of photo-crosslinked polymer liquid crystal. In the same manner as described with respect to the liquid crystal element 20. In the liquid crystal element 40, the alignment direction of mesogen groups in the layer 42 of photo-crosslinked polymer liquid crystal i.e. the longitudinal direction of mesogen groups aligned in a direction horizontal to the surface of the substrate 41 (the direction of the long axis of an elliptical shape as shown by a dotted line in FIG. 3) is different from the direction of the long axis of the line-and-space pattern imparted to the layer 42 of photo-crosslinked polymer liquid crystal. Further, in the liquid crystal element 40, the layer 42 of photo-crosslinked polymer liquid crystal has superior light resistance and has a line-and-space pattern with superior precision.

The liquid crystal element having a line-and-space (lattice-form) pattern prepared as described above may further be processed in such a manner that a curable composition is filled into at least grooves of the pattern in the layer of the cured product of cross-linkable polymer liquid crystal, and the curable composition is cured. At that time, the surface of protrusions of the above pattern may be covered with the curable composition, and the curable composition may be cured. The curable material to be filled in the grooves may be the above described cross-linkable polymer liquid crystal or liquid-crystallizable monomer. Further, it may be an isotropic curable composition (such as an UV curable resin) having no mesogen groups.

Particularly, in the case of filling the above grooves by using a liquid crystal material, it is possible to align mesogen groups of the liquid crystal material by the line-and-space formed in the polymer liquid crystal layer. That is, the layer of polymer liquid crystal having a pattern formed as described above, has a role of modulating light and also has a role of aligning the liquid crystal material. Thus, in the case of filling the grooves by using a liquid crystal material, the thickness of the liquid crystal element may be reduced. Further, since a layer made of an isotropic material is not contained in the liquid crystal element, deterioration of the optical properties can be suppressed. Further, the angle dependency of the incident angle of light can be reduced.

EXAMPLES

Now, the present invention will be described in detail with reference to Examples, but it should be understood that the present invention is by no means limited thereto. Examples 1 to 4, 10 and 11 are Working Examples of the present invention, Examples 5 to 8 are Comparative Examples, and Example 9 is an Evaluation Example for light resistance.

Synthesis Example 1

Synthesis of Polymer Liquid Crystal (B-1)

In accordance with the following chemical reaction formula (1), polymer liquid crystal (B-1) was synthesized.

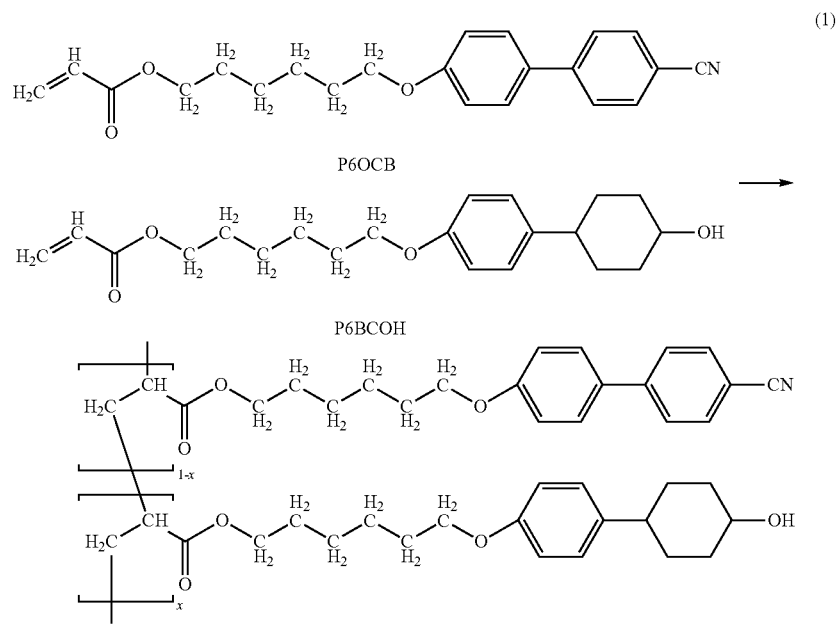

In the chemical reaction formula (1), x is a ratio (molar ratio) of the number of units of liquid-crystallizable monomer (P6BCOH) to the total of the number of units of liquid-cryallizable monomer (P6OCB) and the number of units of liquid-crystallizable monomer (P6BCOH).

Into a 10 mL screw-top test tube, 2.0 g of liquid-crystallizable monomer (P6OCB), 1.92 g of liquid-crystallizable monomer (P6BCOH), 40 mg of a polymerization initiator (tradename "V40", manufactured by Wako Pure Chemical Industries, Ltd.), 120 mg of 1-dodecanethiol (chain-transfer agent) and 4.8 g of N,N-dimethylformamide were put, and after replacing air in the screw-top test tube with nitrogen, the screw-top test tube was hermetically closed. The screw-top test tube was stirred and shaken for 18 hours in a constant temperature vessel at 80° C. to carry out polymerization of the liquid-crystallizable monomers. Here, the molar ratio of P6OCB to P6BCOH was 0.5:0.5.

After the reaction, the reaction product was washed in methanol to remove non-reacted liquid-crystallizable monomers, and then, the product was dissolved in tetrahydrofuran. The obtained solution was dropwise added into methanol to carry out reprecipitation and purification of the product. Thereafter, the product was dried by a vacuum dryer at 40° C. for 2 hours to obtain 3.68 g (yield: 92%) of white polymer liquid crystal (B-1).

Of the polymer liquid crystal (B-1) obtained in Synthesis Example 1, the number average molecular weight (Mn) was 5,900, the melting point (Tm) was 66° C., the glass transition point (Tg) temperature was 21° C., and the polymer purity was higher than 99%. Further, no clearing point (Tc) was observed.

Synthesis Example 2

Synthesis of Cross-Linkable Polymer Liquid Crystal (B-2)

Using polymer liquid crystal (B-1) obtained in Synthesis Example 1, in accordance with the following chemical reaction formula (2), cross-linkable polymer liquid crystal (B-2) was obtained.

Preparation of Cross-Linkable Polymer Liquid Crystal Solutions

Preparation Example 1

To 325 parts by mass of cyclohexanone, 100 parts by mass of cross-linkable polymer liquid crystal (B-2) and 1 part by mass of a polymerization initiator (IRGACURE 184, manufactured by Ciba Specialty Chemicals K.K.) were mixed, and the obtained mixture was filtered by means of a polytetrafluoroethylene (PTFE) filter having a pore diameter of 0.5 μm to obtain a cross-linkable polymer liquid crystal solution (b-22). Here, to the cross-linkable polymer liquid crystal solution

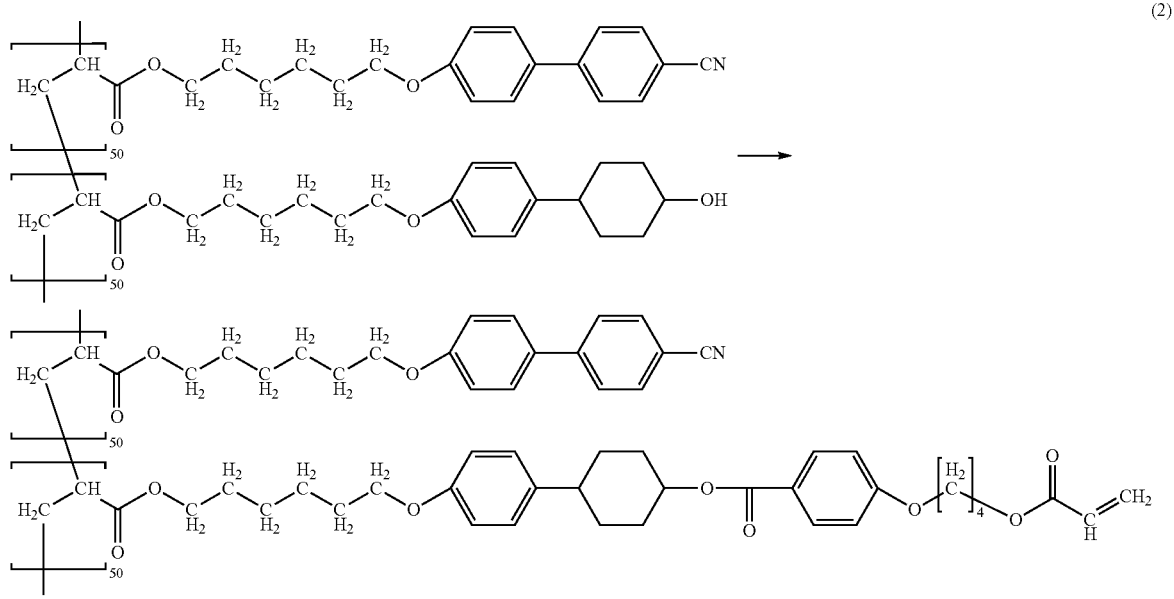

(2)

Into a 200 mL three-necked flask, 3.5 g of polymer liquid crystal (B-1), 3.35 g (12.9 mmol) of 4-(4-acryloxy-butyloxy) benzoic acid (ST1680, manufactured by SYNTON), 2.58 g (21.4 mmol) of dicyclohexylcarbodiimide, 0.466 g (3.82 mmol) of 1,4-dimethylaminopyridine and 200 ml of dichloromethane were put, and the content was stirred at room temperature for a day and a night.

The obtained reaction solution was filtered, and the filtrate was dropped into hexane and stirred for 10 minutes, whereupon a polymer was taken out. Further, this polymer was dissolved in tetrahydrofuran, and the obtained solution was dropped into methanol to carry out reprecipitation and purification of the polymer. Thereafter, the polymer was dried at room temperature for 2 hours in a vacuum dryer to obtain 3.2 g (yield: 90%) of white cross-linkable polymer liquid crystal (B-2).

Of cross-linkable polymer liquid crystal (B-2) obtained in Synthesis Example 2, the number average molecular weight (Mn) was 10,000, the glass transition point (Tg) temperature was 20° C., the clearing point (Tc) temperature was 134° C., and the polymer purity was higher than 99%. Further, no melting point (Tm) was observed. Further, the viscosity of cross-linkable polymer liquid crystal (B-2) was about $10^5$ Pa·sec. at 45° C., about $10^4$ Pa·sec. at 50° C. and about 200 Pa·sec. at 80° C.

(b-22), 0.2 part by mass of a surfactant (S420 manufactured by SEIMI CHEMICAL CO., LTD.) per 100 parts by mass of cross-linkable polymer liquid crystal (B-2) was also added. Here, the surfactant was employed in order to control the horizontal alignment of mesogen groups of cross-linkable polymer liquid crystal.

Preparation Example 2

Cross-linkable polymer liquid crystal solution (b-23) was obtained in the same manner as in Preparation Example 1 except that the amount of cyclohexanone was changed to 500 parts by mass.

Preparation Example 3

To 635 parts by mass of cyclohexanone, 100 parts by mass of cross-linkable polymer liquid crystal (B-2), 1 part by mass of a polymerization initiator and 0.2 part by mass of a surfactant were mixed, and the obtained mixture was filtered by means of a polytetrafluoroethylene (PTFE) filter having a pore diameter of 0.5 μm to obtain cross-linkable polymer liquid crystal solution (b-24). The surfactant was employed to control the horizontal alignment of mesogen groups of cross-linkable polymer liquid crystal.

Preparation Example 4

Cross-linkable polymer liquid crystal solution (b-25) was obtained in the same manner as in Preparation Example 3 except that the amount of cyclohexanone was changed to 325 parts by mass.

Preparation of Liquid Crystal Elements

Example 1

By sequentially carrying out the following steps [a], [b] and [c], a liquid crystal element 1 was obtained which had a polymer liquid crystal layer having a pattern formed on its surface, on an alignment-treated glass substrate.

[a] Formation of Cross-Linkable Polymer Liquid Crystal Layer

On a glass substrate having horizontal alignment treatment applied, the cross-linkable polymer liquid crystal solution (b-22) was applied by a spin coating method and dried at 50° C. for 10 minutes to evaporate the solvent thereby to form a layer of cross-linkable polymer liquid crystal. Then, by maintaining the assembly at 100° C. for 3 minutes, treatment for aligning mesogen groups of cross-linkable polymer liquid crystal (B-2) was carried out. By this alignment treatment, mesogen groups of cross-linkable polymer liquid crystal (B-2) were horizontally aligned to the surface of the glass substrate. Thus, glass substrate A provided with a cross-linkable polymer liquid crystal layer was obtained.

Further, on a glass substrate having horizontal alignment treatment applied, the cross-linkable polymer liquid crystal solution (b-24) was applied by a spin coating method and dried at 50° C. for 10 minutes to evaporate the solvent thereby to form a layer of cross-linkable polymer liquid crystal. Then, by maintaining the assembly at 100° C. for 3 minutes, treatment for aligning mesogen groups of cross-linkable polymer liquid crystal (B-2) contained in the cross-linkable polymer liquid crystal solution (b-24) was carried out. By this alignment treatment, mesogen groups of cross-linkable polymer liquid crystal (B-2) were horizontally aligned to the surface of the glass substrate. Thus, glass substrate B provided with a cross-linkable polymer liquid crystal layer was obtained.

The film thickness of the obtained substrate B was 0.92 µm, the retardation value was 138 nm, and the haze value was 0.2.

[b] Crosslinking of Cross-Linkable Polymer Liquid Crystal

Glass substrate A or B provided with a cross-linkable polymer liquid crystal layer obtained in step [a] was heated to 45° C., and mold A was pressed against the cross-linkable polymer liquid crystal layer. As a means to exert a pressure to mold A, a roller was used. The pressure exerted to mold A was 0.2 MPa. Here, mold A was one having a rectangular pattern as shown in FIG. 1 and Table 1 (P, L and H in Table 1 represent P, W and H in FIG. 1, respectively).

TABLE 1

|  | P | L | H |
|---|---|---|---|
| Mold A | 150 nm | 100 nm | 200 nm |

Glass substrate A: at that time, disposition of mold A and the glass substrate provided with a cross-linkable polymer liquid crystal layer was adjusted so that the angle (transfer direction) of the alignment direction of mesogen groups of cross-linkable polymer liquid crystal to the longitudinal direction of the pattern of mold A becomes 0°. Then, mold A was pressed against the cross-linkable polymer liquid crystal layer to transfer a reverse pattern of a pattern of the mold A, and while maintaining such a state, the cross-linkable polymer liquid crystal layer was irradiated for 5 minutes with ultraviolet rays with an illuminance of 260 mW/cm$^2$ at room temperature in a nitrogen atmosphere to carry out photocuring of the cross-linkable polymer liquid crystal (B-2).

[c] Removal of Mold

From the cross-linkable polymer liquid crystal layer, mold A was removed at room temperature to obtain a liquid crystal element 1 having a polymer liquid crystal layer having the reverse pattern of mold A formed on its surface.

Examples 2, 3, 4 and 11

Liquid crystal elements 2, 3, 4 and 6 were obtained in the same manner as in Example 1 except that in the step [b], the mold, transfer direction, transfer temperature (the temperature at the time of transferring the pattern of the mold by pressing mold A against the cross-linkable polymer liquid crystal layer), etc. were changed as shown in Table 2.

TABLE 2

|  | Ex. 1 Liquid crystal element 1 | Ex. 2 Liquid crystal element 2 | Ex. 3 Liquid crystal element 3 | Ex. 4 Liquid crystal element 4 | Ex. 11 Liquid crystal element 6 |
|---|---|---|---|---|---|
| Mold | A | A | B | B | A |
| Transfer direction | 0° | 45° | 0° | 45° | 60° |
| Transfer temperature | 45° C. | 45° C. | 40° C. | 40° C. | 45° C. |
| Cross-linkable polymer liquid crystal solution | b-22 | b-22 | b-22 | b-22 | b-24 |

Here, mold B was one having a rectangular pattern as shown in FIG. 1 and Table 3 (P, L and H in Table 3 represent P, W and H in FIG. 1, respectively).

TABLE 3

|  | P | L | H |
|---|---|---|---|
| Mold B | 2.0 µm | 1.0 µm | 0.5 µm |

With respect to liquid crystal elements 1, 2, 3 and 4 obtained, respectively, in Examples 1, 2, 3 and 4, the thickness of the polymer liquid crystal layer, the retardation value (Rd value) (nm) with respect to light with a wavelength of 589 nm, the haze value (%) and the alignment state of liquid crystal are shown in Table 4.

Further, the retardation value in Table 4, and the retardation value (Rd value) and ellipticity in Table 5 given hereinafter, are data obtained by measurements by a rotating analyzer method by means of a retardation film optical material inspection apparatus (RETS-100) manufactured by Otsuka Electronics Co., Ltd. Further, the haze value is data obtained by measurements in accordance with JIS K7105 by means of a haze meter manufactured by Suga Test Instruments Co., Ltd.

TABLE 4

|  |  | Ex. 1 Liquid crystal element 1 | Ex. 2 Liquid crystal element 2 | Ex. 3 Liquid crystal element 3 | Ex. 4 Liquid crystal element 4 |
|---|---|---|---|---|---|
| Thickness of polymer liquid crystal layer (μm) | | 1.65 | 1.60 | 1.62 | 1.64 |
| Portions having no pattern formed (non-transfer portions) | Retardation value | 240 | 241 | 239 | 241 |
| | Haze value | 0.2 | 0.2 | 0.2 | 0.2 |
| | Alignment state of liquid crystal | Horizontal | Horizontal | Horizontal | Horizontal |
| Portions having a pattern formed (transfer portions) | Retardation value | 242 | 238 | 243 | 237 |
| | Haze value | 0.2 | 0.2 | 0.2 | 0.2 |
| | Alignment state of liquid crystal | Horizontal | Horizontal | Horizontal | Horizontal |

Further, liquid crystal elements 1, 2, 3 and 4 obtained, respectively, in Examples 1, 2, 3, and 4, were observed by a polarizing microscope under crossed-nicols, whereby a dark field was obtained like at portions having no pattern transferred (non-transfer portions) and thus it was confirmed that the alignment state of cross-linkable liquid crystal polymer was not changed by the transfer of the pattern of the mold.

Further, in the liquid crystal element 2 obtained in Example 2, a structural birefringence (retardation value Rd=27 nm) attributable to the transferred pattern, was observed.

In addition, the portions having a pattern transferred (transfer-portions) in the liquid crystal elements 1 and 2 obtained, respectively, in Examples 1 and 2, were observed by an atomic force microscope, whereby it was confirmed that a reverse shape of the pattern of mold A was formed.

Further, the liquid crystal elements 3 and 4 obtained, respectively, in Examples 3 and 4 were cut, and the cut surfaces of the liquid crystal elements 3 and 4 were observed by a scanning electron microscope, whereby it was confirmed that a shape equivalent to the pattern of mold B was formed.

Example 5

On a glass substrate having horizontal alignment treatment applied, the cross-linkable polymer liquid crystal solution (b-22) was applied by a spin coating method and dried at 50° C. for 10 minutes to evaporate the solvent thereby to obtain a glass substrate provided with a cross-likable polymer liquid crystal layer. In this Example, as is different from in Example 1, mesogen groups were in a random state as no maintenance at 100° C. for 3 minutes was carried out after evaporating the solvent.

Then, in the same manner as in Example 1, the glass substrate provided with a cross-linkable polymer liquid crystal layer was heated at 45° C., and mold A was pressed against the cross-linkable polymer liquid crystal layer. At that time, the disposition of mold A and the glass substrate provided with a cross-linkable polymer liquid crystal layer was adjusted so that the angle (transfer direction) of the rubbing direction of the substrate to the longitudinal direction of the pattern of mold A became 45°. Then, a reverse pattern of the pattern of mold A was transferred to the cross-linkable polymer liquid crystal layer by pressing mold A against the cross-linkable polymer liquid crystal layer, and while maintaining such a state, the cross-linkable polymer liquid crystal layer was irradiated for 5 minutes with ultraviolet rays with an illuminance of 260 mW/cm$^2$ at room temperature in a nitrogen atmosphere to carry out photo-crosslinking of the cross-linkable polymer liquid crystal (B-2). Mesogen groups of the obtained polymer liquid crystal layer was still in a random state.

Example 6

An experiment was carried out in the same manner as in Example 5 except that mold B was employed as the mold, whereby mesogen groups in the obtained polymer liquid crystal layer remained to be in a random state.

From the results in Examples 5 and 6, it is evident that in the process for transferring a pattern, no change in alignment due to the alignment-controlling force of the mold took place.

Example 7

After carrying out the step [a] in Example 1, the cross-linkable polymer liquid crystal layer was irradiated for 5 minutes with ultraviolet rays with an illuminance of 260 mW/cm$^2$ at room temperature without carrying out transfer of a pattern by pressing a mold, to carry out photo-crosslinking of the cross-linkable polymer liquid crystal (B-2) thereby to form a polymer liquid crystal layer.

It was attempted to form a reverse pattern of mold A to the polymer liquid crystal layer by oxygen plasma etching, but failed since the size of the pattern was small.

Example 8

It was attempted to form a reverse pattern of mold B by oxygen plasma etching to the polymer liquid crystal layer formed in the same manner as in Example 7. Etching was possible, but the corners of the rectangle were rounded, and a pattern of the desired shape was not obtained.

Evaluation of Light Resistance

Example 9

The liquid crystal element 4 and the liquid crystal element obtained in Example 8 were irradiated with a blue laser beam with an intensity of 40 mA/mm$^2$, whereby the liquid crystal element 4 showed no decrease in transmittance with 20 Wh or more, while the liquid crystal element in Example 8 showed a substantial decrease in transmittance with 5 Wh.

Preparation of Liquid Crystal Element having Grooves of Polymer Liquid Crystal Filled

Example 10

Into grooves of the liquid crystal element 2 obtained in Example 2, the cross-linkable polymer liquid crystal solution (b-23) was applied by a spin coating method, dried at 50° C. for 10 minutes and then maintained at 110° C. for 3 minutes to align mesogen groups of cross-linkable polymer liquid crystal (B-2) contained in the cross-linkable polymer liquid crystal solution (b-23). By carrying out such alignment treatment, mesogen groups of cross-linkable polymer liquid crystal (B-2) were horizontally aligned to the surface of the glass substrate.

Then, photo-crosslinking of the cross-linkable polymer liquid crystal (B-2) was carried out by irradiation for 5 minutes with ultraviolet rays in an illuminamce of 260 mW/cm$^2$ at room temperature in a nitrogen atmosphere, to obtain a liquid crystal element 5.

The total thickness of the polymer liquid crystal layer in the liquid crystal element 5 was 2.45 μm, and the thickness of the upper layer was 0.85 μm. Further, the haze value of the liquid crystal element 5 was 0.4. Further, mesogen groups of the polymer liquid crystal in the upper layer were horizontally aligned.

The retardation value of the liquid crystal element 5 at a wavelength of 589 nm was measured and found to be 240 nm without a change. However, when the retardation value was measured in a state where the element was rotated for 45°, the retardation value was 126 nm. This indicates that mesogen groups of polymer liquid crystal in the upper layer were monoaxially aligned in the longitudinal direction of the pattern.

Example 12

Into grooves of the liquid crystal element 6 obtained in Example 11, the cross-linkable polymer liquid crystal solution (b-25) was applied by a spin coating method, dried at 50° C. for 10 minutes, and then maintained at 110° C. for 3 minutes to align mesogen groups of cross-linkable polymer liquid crystal (B-2) contained in the cross-linkable polymer liquid crystal solution (b-25) to be parallel to the groove direction (the direction at 60° to the alignment axis of polymer liquid crystal layer 1) and parallel to the surface of the substrate.

Thereafter, cross-linking of the cross-linkable polymer liquid crystal (B-2) was carried out by irradiation for 5 minutes with ultraviolet rays with an illuminance of 260 mW/cm$^2$ at 60° C. in a nitrogen atmosphere, to form a polymer liquid crystal laminated layer 2 on the liquid crystal element 6.

The thickness of the liquid crystal element 7 thus obtained was 2.73 μm (the thickness of polymer liquid crystal layer 2 was 1.81 μm), and the haze value was 0.4.

Further, the retardation (Rd) values and ellipticity at wavelengths of 450 nm, 550 nm and 650 nm, of the obtained liquid crystal element 7, were measured. The results are shown in Table 5.

TABLE 5

| 450 nm | Rd value | 113 |
|--------|----------|-----|
|        | Ellipticity | 0.87 |
| 550 nm | Rd value | 138 |
|        | Ellipticity | 0.98 |
| 650 nm | Rd value | 154 |
|        | Ellipticity | 0.93 |

The ellipticity of the liquid crystal element 7 at a wavelength of from 450 to 650 nm was at least 0.85, whereby it was confirmed that the liquid crystal element 7 functions as a broadband quarter wave plate.

The obtained liquid crystal element 7 was irradiated with a blue laser beam with an intensity of 40 mW/mm$^2$, whereby the liquid crystal element 7 showed no decrease in transmittance with 20 Wh or more and thus was found to be excellent in light resistance.

As described above, by adjusting the alignment-controlling force of the pattern to be formed in the polymer liquid crystal in the lower layer to be relatively higher than the intermolecular force between the polymer liquid crystal in the lower layer and the polymer liquid crystal in the upper layer, it was possible to prepare a biaxial liquid crystal element (wave plate) wherein the alignment direction of mesogen groups of polymer liquid crystal in the upper layer is on an axis different from the alignment direction of mesogen groups of polymer liquid crystal in the lower layer.

In the present invention, embodiments and Examples of the present invention may be changed or modified without departing from the concept and scope of the present invention.

INDUSTRIAL APPLICABILITY

According to the present invention, it is possible to control alignment of liquid crystal without applying a voltage and to produce a liquid crystal element having microfabrication applied, and such a liquid crystal element is useful as a diffraction grating excellent in light resistance or as an optical element such as a wave plate.

This application is a continuation of PCT Application No. PCT/JP2011/059296 filed on Apr. 14, 2011, which is based upon and claims the benefit of priority from Japanese Patent Application No. 2010-094424 filed on Apr. 15, 2010. The contents of those applications are incorporated herein by reference in its entirety.

REFERENCE SYMBOLS

10: Mold
11: Reverse pattern
20, 40: Liquid crystal element
21, 41: Substrate
22: Layer of cross-linkable polymer liquid crystal
23: Mold
24: Layer of cured product of photo-crosslinked polymer liquid crystal
42: Layer of photo-crosslinked polymer liquid crystal

What is claimed is:

1. A process for producing a liquid crystal element comprising an alignment-treated substrate and a layer of polymer liquid crystal having a pattern, which comprises:
    a step of forming a layer of cross-linkable polymer liquid crystal on the alignment-treated substrate,
    a step of aligning mesogenic groups in the cross-linkable polymer liquid crystal,
    a step of pressing a mold having a reverse pattern of a pattern to be imparted to the layer of polymer liquid crystal, against the layer of cross-linkable polymer liquid crystal, at a temperature higher than the glass transition temperature of the cross-linkable polymer liquid crystal and lower than the clearing point temperature of the cross-linkable polymer liquid crystal,
    a step of cross-linking the cross-linkable polymer liquid crystal while the mold is pressed against the layer of cross-linkable polymer liquid crystal, to form a cured product, and
    a step of removing the mold from the cured product.

2. The process for producing a liquid crystal element according to claim 1, wherein at the time of pressing the mold against the layer of cross-linkable polymer liquid crystal, the viscosity of the layer of cross-linkable polymer liquid crystal is from $10^3$ Pa·sec. to $10^6$ Pa·sec.

3. The process for producing a liquid crystal element according to claim 1, wherein the cross-linkable polymer liquid crystal has a number average molecular weight of from 2,000 to 50,000.

4. The process for producing a liquid crystal element according to claim 1, wherein the step of cross-linking the cross-linkable polymer liquid crystal to form a cured product, includes a step of photo-curing the cross-linkable polymer liquid crystal.

5. The process for producing a liquid crystal element according to claim 1, wherein the layer of polymer liquid crystal having a pattern is a layer of polymer liquid crystal having a lattice pattern.

6. The process for producing a liquid crystal element according to claim 1, which further contains a step of filling a curable composition into grooves of the pattern in the layer of polymer liquid crystal and curing the curable composition.

7. The process for producing a liquid crystal element according to claim 1, wherein the layer of cross-linkable polymer liquid crystal is formed by a solution for forming the layer of cross-linkable polymer liquid crystal, which comprises cross-linkable polymer liquid crystal, a photopolymerization initiator and a surfactant.

8. A liquid crystal element produced by the process for producing a liquid crystal element as defined in claim 1.

* * * * *